UNITED STATES PATENT OFFICE.

NATHAN CRARY SHIVERICK, OF OMAHA, NEBRASKA.

COMPRESSED FEED-RATION.

1,032,511.  Specification of Letters Patent.  Patented July 16, 1912.

No Drawing.  Application filed April 4, 1911. Serial No. 618,838.

*To all whom it may concern:*

Be it known that I, NATHAN C. SHIVERICK, a citizen of the United States, residing at Omaha, county of Douglas, State of Nebraska, have invented certain new and useful Improvements in Compressed Feed-Rations, of which the following is a full, clear, and exact description.

My invention relates to an improved compressed feed ration, particularly for draft animals.

The object of the invention is such that the greatest amount of nutriment may be packed for transportation in minimum bulk, and wherein the combination of the ration will be such that it will not deteriorate under widely differing climatic conditions.

A further object of the invention is the production of a feed ration which shall be as palatable as the natural food stuff, and one in which the constituents are so treated as to be readily digestible even where the food is bolted, and on the other hand, the form of the ration is such as to induce mastication.

In practising my invention, the grain, oats, for example, is crushed only sufficiently to expose the grain kernel, but not enough to detach the husk. The purpose of this step is to render the grain easily digestible whether properly masticated or not. After crushing, the grain is heated to 212° F. or higher for approximately twenty hours, or sufficiently long to expel all moisture in order that the grain will keep, unimpaired. After the heating operation, and while the grain is entirely free of moisture, it is mixed with hot molasses, which is boiling at 260° F., but the heat must not be sufficient to convert the molasses into caramel, and the boiling is discontinued practically as soon as the grain is introduced. The proportions of the mixture are preferably about 100 pounds of oats to approximately 2½ gallons of molasses, measured before boiling. The mixture is then cooled to a temperature of about 58 to 85°, and is then subjected in quantities of about five pounds to a pressure of from 1500 to 4000 pounds per square inch, the number of pounds depending upon the quantity to be fed, which varies with different animals and different kinds of work. As the mixture of grain and molasses goes into the press, about four-tenths of an ounce of salt may be placed in one corner of the mold, to be pressed with and into the cake, which salt may be used or thrown out when the ration is fed. The press may be oiled with raw linseed oil to prevent sticking. Some of the oil is absorbed by the outer surface of the cakes, thus rendering the same more proof against moisture. The linseed oil also has a food value. The cakes so formed are then wrapped in moisture proof paper, and preferably packed under pressure in bales or boxes, or the like. The packing under pressure is of particular advantage, as it practically eliminates swelling. The feed material thus treated will diminish in weight about 20% and in bulk about 35%, and is particularly advantageous in the transportation of food for grain eating animals. By the use of this ration the animal obtains the entire benefit of all the grain and of the binding material. The forage so produced is in no sense an emergency ration, or a highly concentrated one, nor is it one made from the by-products of the grain or other material from which the best constituents have been extracted. One of the main objects of the production of the ration is to preserve intact the full food value of the grain, including both the grain kernel and the husks.

By crushing the grain sufficiently to split the husk and expose the kernel, the action of the intestinal juices is effective even if mastication is improperly performed. The boiling of the molasses, and the mixing of the grain therewith at the comparatively high temperature is for preservative purposes only, and it is to be understood that the mixture is not intended to be cooked in any sense, as it is permitted to boil for but a few seconds after the grain is added.

In feeding the ration, a cake which is of sufficient size to constitute a meal is crushed in the hands and fed dry, or, if desired, a small quantity, or about half a pint of water, may be added, although it is perfectly palatable without the water.

While I have herein specified certain degrees of temperature, proportions, and periods of time, it is to be understood that my invention is not confined to the particular data given, as the same may require alteration under different climatic conditions.

What I claim is:

1. The process of producing a compressed feed ration, which comprises crushing the grain only sufficiently to split the husk, but not to separate the same from the grain kernel, thoroughly expelling all moisture from the split grain, mixing the split and dried grain with molasses heated to a temperature of approximately 260° F., or below that at which it will caramelize, cooling the mixture and compressing the cooled mixture into a condensed cake or cakes.

2. A feed ration comprising a basis of crushed and dried grain and heated but uncaramelized molasses, the latter being distributed homogeneously throughout the basis, and the whole being pressed into a more or less solid cake, said cake being treated with linseed oil and wrapped in moisture proof covering.

3. The process of producing a feed ration which consists in crushing the grain sufficiently to split the husk and expose the grain kernel, mixing the split grain with molasses at a temperature just below that at which molasses will caramelize, compressing the cold mixture into more or less solid cakes, and treating said cakes with linseed oil, wrapping the same in moisture proof coverings.

NATHAN CRARY SHIVERICK.

Witnesses:
JOHN A. WAGNER,
JULIAN A. BENJAMIN.